US009432754B2

(12) United States Patent
Fenkes et al.

(10) Patent No.: US 9,432,754 B2
(45) Date of Patent: *Aug. 30, 2016

(54) MAINTAINING A FABRIC NAME ACROSS A DISTRIBUTED SWITCH

(71) Applicant: GLOBALFOUNDRIES INC., Grand Cayman, KY (US)

(72) Inventors: Joachim Fenkes, Tübingen (DE); Roger G. Hathorn, Tucson, AZ (US); Sriharsha Jayanarayana, Bangalore (IN); Henry J. May, Cedar Falls, IA (US); Daniel Sentler, Steinenbronn (DE); Sudheer R. Yelanduru, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 210 days.

This patent is subject to a terminal disclaimer.

(21) Appl. No.: 14/077,492

(22) Filed: Nov. 12, 2013

(65) Prior Publication Data

US 2015/0110487 A1  Apr. 23, 2015

Related U.S. Application Data

(63) Continuation of application No. 14/058,545, filed on Oct. 21, 2013.

(51) Int. Cl.
H04Q 11/00 (2006.01)
H04L 12/24 (2006.01)
H04L 29/12 (2006.01)
(Continued)

(52) U.S. Cl.
CPC ........ *H04Q 11/0067* (2013.01); *H04L 41/0889* (2013.01); *H04Q 11/0005* (2013.01); *H04L 45/44* (2013.01); *H04L 61/6004* (2013.01); *H04L 61/6045* (2013.01); *H04Q 2011/0088* (2013.01)

(58) Field of Classification Search
CPC ... H04L 1/0889; H04L 45/44; H04L 61/6004; H04L 61/6045; H04Q 11/0005; H04Q 11/0067; H04Q 2011/0088
USPC ........................................... 370/392
See application file for complete search history.

(56) References Cited

U.S. PATENT DOCUMENTS 7,447,198 B1    11/2008  Banks et al.
8,166,196 B2     4/2012  Nidumolu et al.
8,948,176 B1 *   2/2015  Desanti et al. ........... 370/392

(Continued)

OTHER PUBLICATIONS

Fibre Channel, Backbone—6 (FC-BB-6) REV 1.2, INCITS working draft proposed American National Standard for Information Technology, Ch. 7, Dec. 5, 2012, pp. 86-160, http://www.t11.org/ftp/t11/pub/fc/bb-6/12-007v3.pdf.

(Continued)

*Primary Examiner* — Alpus H Hsu
*Assistant Examiner* — Walter Devito
(74) *Attorney, Agent, or Firm* — Scully Scott Murphy and Presser

(57) ABSTRACT

Techniques are provided for distributing a fabric name to switching elements of a distributed switch configured to forward Fibre Channel over Ethernet (FCoE) frames. A distributed switch membership distributed (DMFD) message is transmitted that includes names of all switching elements in the distributed switch, and further includes a fabric descriptor that contains the fabric name.

6 Claims, 4 Drawing Sheets

(51) Int. Cl.
*H04L 12/721* (2013.01)
*H04L 12/28* (2006.01)

(56) References Cited

U.S. PATENT DOCUMENTS

2009/0252181 A1* 10/2009 Desanti .................... 370/474
2012/0134672 A1    5/2012 Banerjee
2012/0177042 A1*  7/2012 Berman .................... 370/392
2012/0230340 A1    9/2012 Armstrong et al.
2012/0307822 A1   12/2012 Eisenhauer et al.
2013/0028135 A1    1/2013 Berman
2013/0287389 A1* 10/2013 Ayandeh .................... 398/5

OTHER PUBLICATIONS

Fibre Channel, Switch Fabric—6 (FC-SW-6) Rev 1.2, INCITS working draft proposed American National Standard for Information Technology, Ch. 17, Feb. 1, 2013, pp. 269-317, http://www.t11.org/ftp/t11/pub/fc/sw-6/13-047v0.pdf.

* cited by examiner

MAINTAINING A FABRIC NAME ACROSS A DISTRIBUTED SWITCH

CROSS-REFERENCE TO RELATED APPLICATIONS

This application is a continuation of co-pending U.S. patent application Ser. No. 14/058,545, filed Oct. 21, 2013. The aforementioned related patent application is herein incorporated by reference in its entirety.

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

Fibre Channel (FC) can be used to connect these servers and computing resources, including connecting computer systems to storage devices such as storage area network (SAN) devices. Fibre Channel is a high speed medium primarily used for data transfer and storage, but may also be used to connect other devices, servers, printers, etc. Fibre Channel is essentially a serial data channel, often created over fiber optic cabling, that provides a logical bi-directional, point-to-point connection between a host and a device.

BRIEF SUMMARY

Embodiments of the present disclosure provide a method, product, and system for performing an operation for distributing a switch name in a distributed Fibre Channel fabric or a distributed FCoE fabric in which FC frames are encapsulated in Ethernet frames. The operation includes instantiating a switch link between a controlling FCoE forwarder (cFCF) of the distributed Fibre Channel fabric and a first FCoE dataplane forwarder (FDF). The distributed Fibre Channel fabric may include a set of FDFs and the cFCF. The operation further includes receiving, from the cFCF, a distributed switch membership distribution (DFMD) message. The DFMD message may contain a fabric name identifying with the distributed Fibre Channel fabric. The operation includes modifying the first FDF to join the distributed Fibre Channel fabric based on the fabric name contained in the DFMD.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

Figure 1:
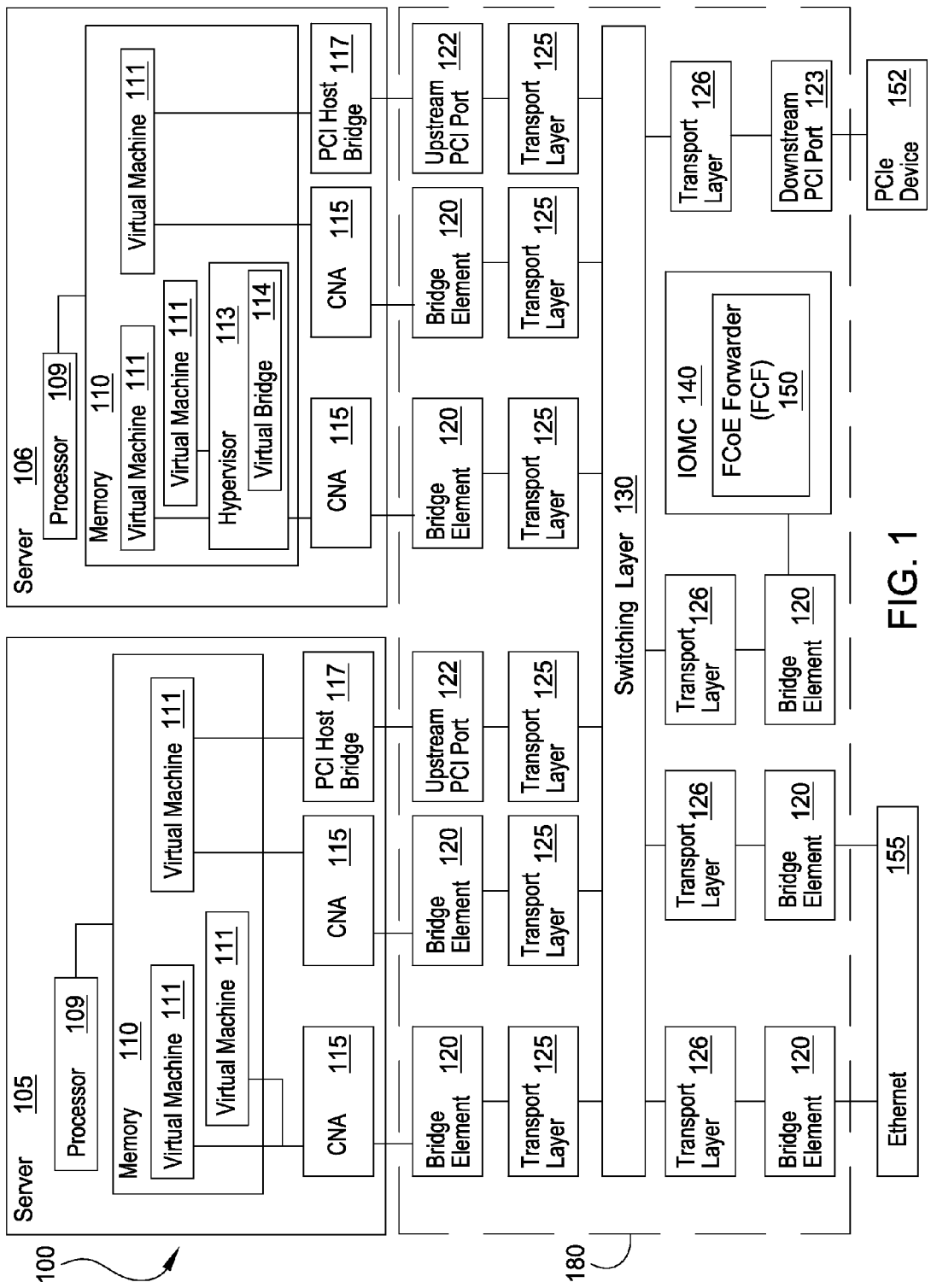
FIG. 1 illustrates a system architecture that includes a distributed network switch, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Devices may be connected on Fibre Channel systems using various interconnection topologies and devices, such as switches, hubs, and bridges, to allow scalability based on users' needs. As Fibre Channel networks get larger and network demands increase, switching may be implemented. A switched Fibre Channel network is referred to herein a "fabric." A fabric is simply the underlying switching architecture used by a Fibre Channel switch. A fabric may contain many loops interconnected with switches.

Fibre Channel over Ethernet (FCoE) refers to a technology used for transporting Fibre Channel (FC) frames over Ethernet, which is standardized at the Technical Committee for Fibre Channel (T11) of the International Committee for Information Technology Standards (INCITS). The transported FC frames used are based on an FC architecture for storage networking purposes. The FC-BB-6 and FC-SW-6 working groups of the T11 Fibre Channel standards committee are working to develop a distributed switch model with associated protocols. In conjunction with the technology used for transporting FC frames over Ethernet, a distributed switch model and associated protocols of the current state of the art may be applied to both FCoE switches or standard FC switches.

A Fibre Channel switch uses a unique identifier, referred to as a World Wide Name (WWN) to identify a fabric. End points log into the fabric, i.e., establish a connection with the switch, in order to communicate with other endpoints on the fabric. For a standalone switch, assigning the fabric name may be simple. The fabric name is the WWN of the switch controlling the fabric, and endpoints connected to any port on the switch will see the same fabric name. However, this approach becomes problematic when implementing a distributed switch with multiple discrete switches, each having a unique WWN. The fabric must present the same name to an endpoint, regardless of the switch unit that owns the port where the endpoint is attached. Conventional techniques require a fabric name to be manually configured and entered into each element of an FCoE fabric. As result, configuration errors are commonplace and efficiency and productivity may be reduced.

In contrast, and to address the inefficiencies and performance issues previously described, the illustrated embodiments provide mechanisms for Fibre Channel forwarder fabric initialization sequence in a Fibre Channel switch environment, where a controlling Fibre Channel Forwarder (cFCF) is separated from a Fibre Channel over Ethernet (FCoE) data forwarder (FDF). The mechanisms, by way of example only, transmits a distributed switch membership distribution (DFMD) message which contains the WWNs of all switching elements in the fabric, and in addition, contain the WWN of the fabric itself.

In the following, reference is made to embodiments of the disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a system architecture 100 that includes a distributed network switch 180, according to one embodiment of the present disclosure. The computer system 100 includes first and second servers 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115, sometimes referred to as converged network adapters (CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fibre Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the distributed network switch, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that are coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks. After routing the cells, the switching layer 130 may communicate with transport layer modules 125 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

In one embodiment, distributed network switch 180 may be configured to act as a FCoE Forwarder (FCF) 150, which is a Fibre Channel switching element that is able to forward FCoE frames across one or more switch ports to connected endpoints (i.e., servers 105, 106, storage devices). One example of an FCoE Forwarder is further described in the Fibre Channel Backbone 5 (FC-BB-5) standard published by T11 working group of the International Committee for Information Technology Standards (INCITS). The IOMC 140 is depicted in FIG. 1 having an instance of a FCF 150 that manages execution of FCF functionality across the bridge elements 120 of the distributed network switch 180. In one embodiment, the FCF 150 may be a distributed FCF where a controlling FCF element provides FC services to a large number of endpoints through many intermediate switches. An example of a distributed FCF is shown in FIG. 2.

Figure 2:
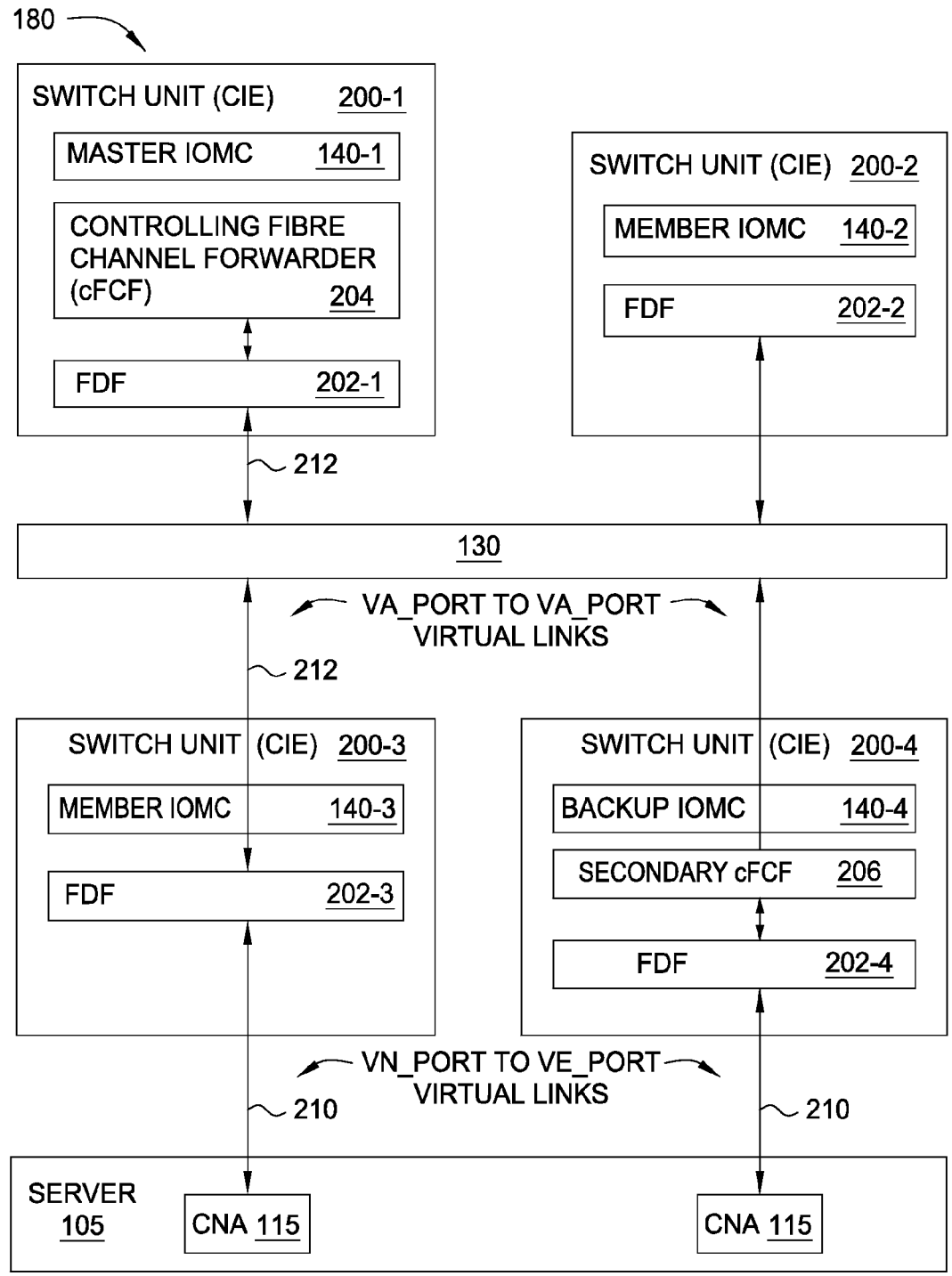
FIG. 2 illustrates the distributed network switch configured for Fibre Channel switching, according to one embodiment of the present disclosure.

FIG. 2 illustrates the distributed network switch 180 having a plurality of bridge elements 120 connected to the server 105, according to one embodiment of the present disclosure. As shown in FIG. 2, the bridge elements 120 are organized into a plurality of switch modules 200 (e.g., 200-1, 200-2, 200-3, 200-4). The distributed network switch 180 disclosed herein is configured to provide distributed FCoE switching via multiple switch modules 200, the switching layer 130 interconnecting the switch modules 200, and management firmware executing on a management controller, e.g., IOMC 140.

A switch module 200 (sometimes referred to as a chassis interconnect elements or CIE) may be a physical switch unit configured to provide network bridging for the distributed network switch 180. In one embodiment, the switch modules 200 are hardware components (e.g., PCB boards, FPGA boards, system on a chip, etc.) that provide physical support and connectivity between the network adapters 115 and the bridge elements 120. Each switch module 200 may include a logical or physical grouping of bridge elements 120. Each bridge element 120 may be a distributed Virtual Ethernet bridge (dVEB) configured to forward data frames throughout the distributed network switch 180, including data frames comprising FCoE frames. In one embodiment, each bridge element 120 may have at least two ports, one port connecting to the switching layer 130 and another port connected to the servers 105 and 106 (e.g., via network adapters 115). The bridge elements 120 may forward data frames transmitted by the network adapter 115 to the switching layer 130. In one implementation, a network adapter 115 and bridge element 120 may be connected using two 40 Gbit Ethernet connections or one 100 Gbit Ethernet connection.

According to one embodiment, the distributed network switch 180 may be a distributed FCF having a set of FCoE Data Forwarders 202 (FDFs) associated with at least one controlling FCF 204, 206 that controls the operations of the set of FDFs. The cFCFs 204, 206 defines a control plane for managing the distributed FCF and the FDFs 202 define a data plane for forwarding FCoE frames. The cFCFs and FDFs operate together to behave as a single distributed FCF such that a FCoE frame ingressing on a port in one switch module 200 may be routed to egress from a port in any other switch module 200. From an external point of view (i.e., from the perspective of the server 105), the distributed FCF behaves as an FCF. In particular, the distributed FCF supports instantiation of VN_Port to VF_Port virtual links 210 with ENode MAC addresses (i.e., CNAs 115), and instantiation of VE_Port to VE_Port virtual links (not shown) with FCF-MACs. A VN_Port is a Virtual N_Port and refers to a port in an Enhanced Ethernet node (ENode), and a VF_Port is a Virtual Fort a port in an FCoE-capable Ethernet switch. A VE_Port is a Virtual E_port and refers to an inters-witch link port. From an internal point of view (i.e., from the perspective of the FCF), the distributed FCF may instantiate VA_port to VA_port virtual links 212 to enable FCoE frame forwarding between the cFCFs 204, 206 and FDFs 202, as well as between FDFs 202. A VA_port is an instance of the FC-2V sublevel of Fibre Channel that connects to another VA_port, and which is dynamically instantiated together with an FCoE_LEP on successful completion of a FIP_ELP Exchange. VA_port to VA_port virtual links 212 may also be used to exchange control information between cFCFs 204, 206 and FDFs 202, as described in greater detail later.

In one embodiment, each switch module 200 may instantiate a FDF 202 (FDF), which are simplified FCoE switching entities that forward FC frames among ports through the distributed network switch 180. In one embodiment, a FDF 202 is a simplified FCoE switching element configured to forward FC frames among VA_ports and VF_ports through a Fibre Channel data-plane forwarder (FCDF) switching element. In some embodiments, an FDF 202 is functionally composed of a FCDF switching element with at least one Lossless Ethernet MAC (FDF-MAC), which may be physical or virtual ports of a switch module 200. The FDF 202 may support instantiation of VA_Ports and VF_Ports over its FDF-MACs.

In one embodiment, at least one of the switch modules 200 includes a primary controlling FCoE forwarder 204, 206 (sometimes referred to as a controlling FCF, cFCF, or primary controlling switch). The cFCFs are configured to control and manage FDFs 202 to provide fabric services, through the FDFs 202 on each switch module 200, to all endpoints (e.g., server 105) connected to the switch ports. In the embodiment shown in FIG. 2, the switch modules 200 include a primary cFCF 204 that controls the FDFs 202, and a secondary cFCF 206 that synchronizes state with the primary cFCF 204 and is able to resume operation in case of failure of the primary cFCF 204. Examples of FDFs and cFCFs are described in the Fibre Channel Backbone-6 (FC-BB-6) and the Fibre Channel Switch Fabric 6 (FC-SW-6) standards published by T11 working group of the International Committee for Information Technology Standards (INCITS).

To operate as a single distributed fabric, each of the FCoE switching elements (i.e., FDFs, cFCFs) share a fabric name, such as a World Wide Name (WWN), that identifies the fabric to connected entities. The fabric is configured to present the same name to an endpoint, regardless of the switch module 200 that owns the port where the endpoint is attached. Accordingly, embodiments of the present disclosure provide a mechanism for distributing a fabric name to elements of a distributed Fibre Channel (e.g., FCoE) switch. In one embodiment, the mechanism modifies and extends a Distributed Switch Membership Distribution (DFMD) message to include a descriptor that contains the fabric name. DFMD messages are used by controlling switches (e.g., cFCFs) to communicate to an FDF the identities of the primary cFCF and secondary cFCF and all of the FDFs that comprise the distributed network switch 180.

Figure 3A:
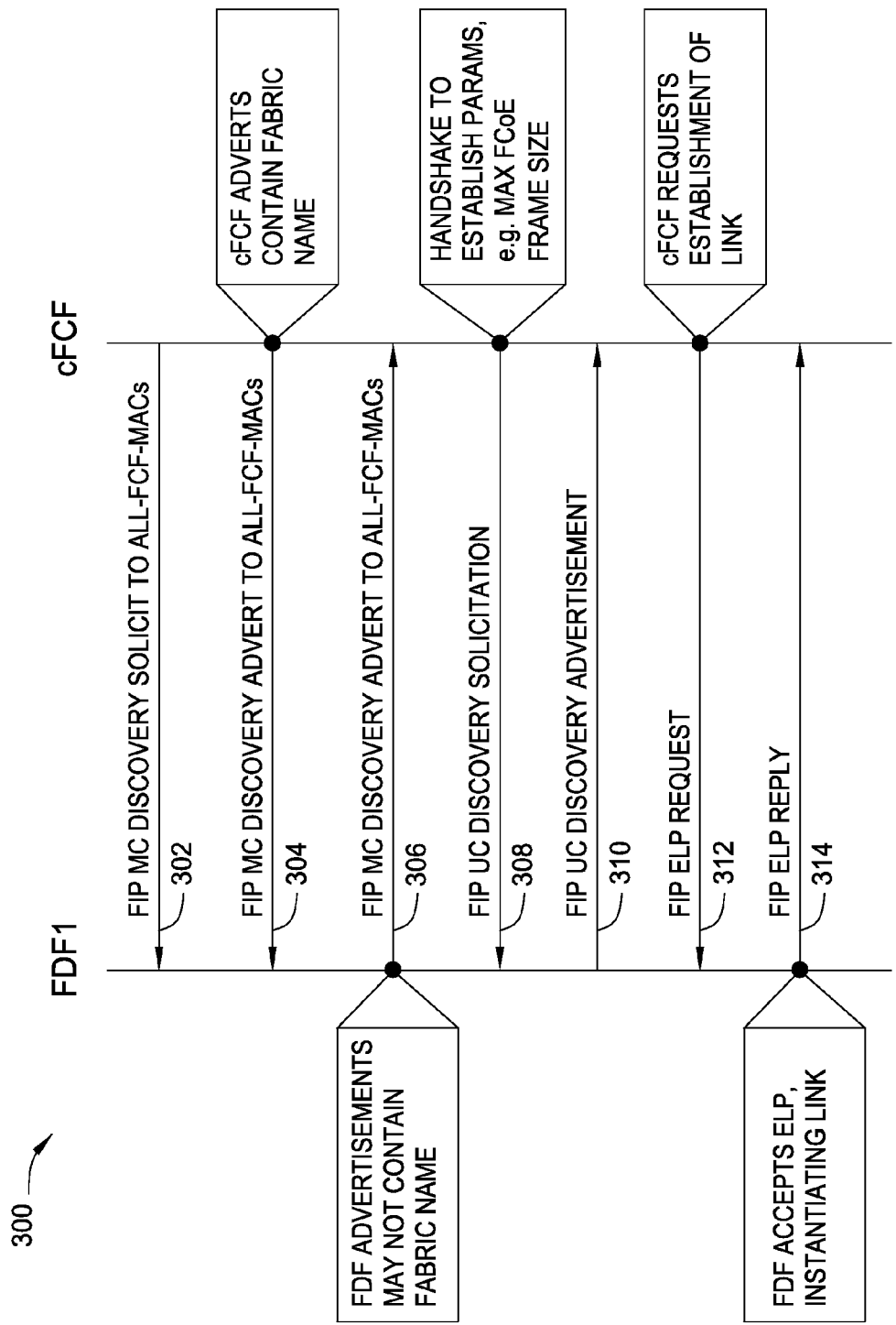
FIGS. 3A and 3B are sequence diagrams depicting a method for distributing a fabric name in the distributed network switch, according to one embodiment of the present disclosure.
Figure 3B:
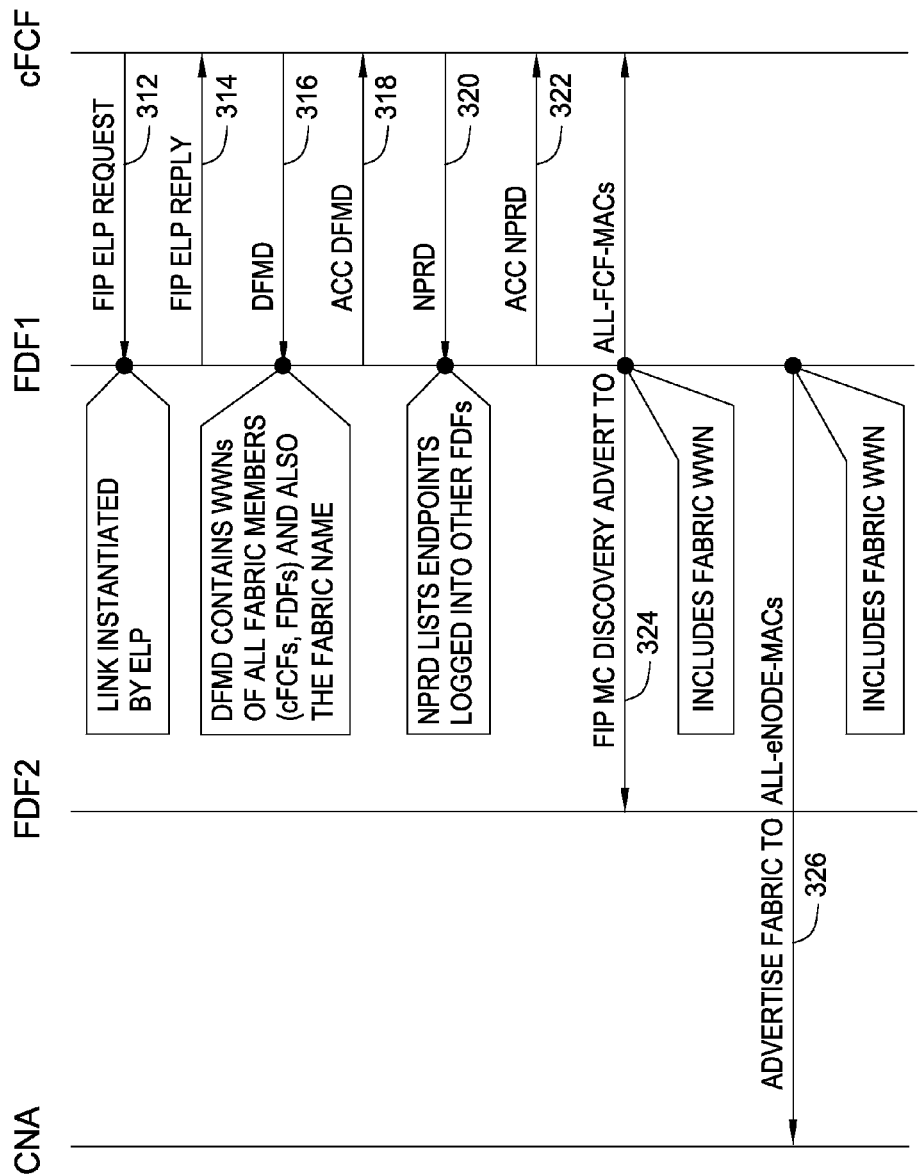

FIGS. 3A and 3B are flowcharts depicting a method 300 for distributing a fabric name to switch elements of a distributed FCF, according to one embodiment of the present disclosure. FIG. 3A illustrates how an FDF 202 (e.g., FDF1) and a cFCF 204 discover each other within the distributed network switch 180 and instantiate a virtual link between switching elements through a FCoE Initialization Protocol (FIP) discovery protocol, although it should be appreciated that other protocols may be used. In one example scenario, the FDF1 may be a switch module 200 that was newly added to the distributed network switch 180. In another example, the FDF1 may be a switch module 200 that was previously offline and is now coming online.

As shown, the method 300 begins at step 302, where the cFCF 204 transmits a multicast (MC) discovery solicitation message to all switching elements (e.g., FDFs 202) within distributed network switch 180 to identify any FDFs that may already be up. In one embodiment, the cFCF 204 periodically broadcasts an FCoE Initialization Protocol (FIP) Discovery Solicitation message to an "All-FCF-MACs" group address listened to by switching elements within the distributed network switch.

cFCFs and FDFs may periodically transmit messages advertising their status and exchange parameters related to joining the fabric. At step 304, the cFCF 204 transmits a discovery advertisement to switching elements (e.g., FDFs 202) within the distributed network switch 180. In some embodiments, the cFCF 204 broadcasts (e.g., via multicast) a FIP Discovery Advertisement message to the "All-FCF-MACS" group addressed listened to by FDFs within the distributed network switch.

In one embodiment, a Discovery Advertisement message may include a priority descriptor used by endpoints to select a FCF to which to perform a FIP login, a MAC address descriptor, a name identifier descriptor, a fabric descriptor, and a period descriptor (i.e., FKA_ADV_Period) which specifies periodic reception and transmission of keep alive messages. Table 1 illustrates one embodiment of a fabric descriptor used in FIP operations.

FCF in a VLAN may contain the same single Fabric descriptor. The VF_ID field in the fabric descriptor may be set to the VF_ID identifying the advertised fabric. If a VF_ID field is not defined for the advertised fabric, the VF_ID field may be set to zero. The FC-MAP field in the fabric descriptor may be set to the FC-MAP value the FCF is using. If the FC-MAP value is not administratively configured, then the FC-MAP value may be set to a default FC-MAP value. According to one embodiment, the fabric name field in the fabric descriptor is set to the fabric name for the originating FCF.

As such, the discovery advertisement transmitted by the cFCF 204 may contain the fabric name, i.e., the fabric WWN. In one embodiment, the fabric name contained within the discovery advertisement may be name identifier associated with the fabric and that is unique within the fabric. In one implementation, fabric names as referred to herein may have a 48-bit address similar to a 48-bit IEEE Standard 802.1a Universal LAN MAC Address format, although other formats may be utilized.

At step 306, the FDF 202 transmits a discovery advertisement to switching elements (e.g., FDFs 202) within the distributed network switch 180. In one embodiment, an FDF is part of a distributed FCF internal topology if the initialization exchanges with the cFCF 204 are completed. If an FDF is not (yet) part of a distributed FCF internal topology, all VA_port capable FDF-MACs on that FDF shall transmit Discovery Advertisements with the fabric name of the fabric descriptor set to zero. Further, if the FDF is not (yet) part of the distributed FCF internal topology, all VF_port-capable FDF-MACs on that FDF may not transmit Discovery Advertisements. In one embodiment, if an FDF 202 is part of a distributed FCF internal topology, all VA_port capable and VF_port-capable FDF-MACs on that FDF may have the fabric name received from the cFCF 204 in the fabric name of the fabric descriptor in all transmitted discovery advertisements. For example, as shown in FIG. 3A, the FDF 202 is configured to transmit discovery advertisements that do not contain the fabric name, until the FDF is part of the fabric. In some embodiments, the discovery advertisement message transmitted by the FDF contains a zero or null value for the fabric name.

At step 308, responsive to receiving the discovery advertisement from the FDF 202, the cFCF 204 transmits a unicast discovery solicitation to the FDF 202 to initiate a handshake process that establishes parameters for communicating between the cFCF 204 and the FDF 202 and parameters of the

TABLE 1

Example FIP Fabric Descriptor Format

| Bit Word | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|---|---|---|---|---|---|---|
| 0 | \multicolumn{8}{l}{Type = 05h} | | | | | | | | \multicolumn{8}{l}{Length = 04h} | | | | | | | | \multicolumn{4}{l}{Reserved} | | | | \multicolumn{4}{l}{VF_ID} | | | |
| 1 | \multicolumn{8}{l}{Reserved (MSB)} | | | | | | | | | | | | | | | | \multicolumn{8}{l}{FC-MAP} | | | | | | | | (LSB) | | | |
| 2 | (MSB) | | | | | | | | | | | | | | | \multicolumn{8}{l}{Fabric Name} | | | | | | | | | | | | | | | |
| 3 | | | | | | | | | | | | | | | | | | | | | | | | | | | | | | | (LSB) |

As shown, in one embodiment, the fabric descriptor includes a virtual fabric identifier (VF_ID) field that specifies a value that uniquely identifies a virtual fabric among all the virtual fabrics that share a set of switches and ports, a Fibre Channel Mapped Address Prefix (FC-MAP) field that specifies the value to be used as the most significant 24 bits in Fabric Provided MAC Addresses (FPMAs), and a fabric name which identifies the fabric. According to one embodiment, discovery advertisements may contain only a single Fabric descriptor, and all discovery advertisements from an fabric. For example, the cFCF 204 transmits a unicast FIP Discovery Solicitation messages may include a maximum FCoE PDU (protocol data unit) size the cFCF 204 intends to use for FCoE traffic. In some embodiments, upon receiving the Discovery Advertisement, the cFCF 204 may verify whether that the FC-MAP value in the Fabric descriptor in the Discovery Advertisement is the same as the FC-MAP value of the recipient FCF. If not, the cFCF 204 may discard the Discovery Advertisement. In some embodiments, upon receiving Discovery Advertisements, the FCoE controller of a VE_port-capable FCF-MAC (e.g., cFCF 204) may create an entry per FCF-MAC in an internal FCF list. Each entry in the internal FCF list of the cFCF may include a Max FCoE Size Verified bit set to zero for entries created from unsolicited multicast Discovery Advertisements, or set to one when a solicited unicast Discovery Advertisement is received.

At step 310, responsive to receiving the unicast discovery solicitation from the cFCF 204, the FDF 202 (e.g., FDF1) transmits a unicast FIP Discovery Advertisement to the cFCF 204. In some embodiments, after receiving the (unicast) Discovery Solicitation originated by an FCF (i.e., cFCF), the FDF1 may perform a verification check by verifying that the FC-MAP value in the FC-MAP descriptor in the Discovery Solicitation is the same as the FC-MAP value of the recipient FCF. If the verification check is false, the Discovery Solicitation may be discarded.

Responsive to receiving the solicited unicast Discovery Advertisement from the FDF1, the cFCF may set the 'Max FCoE Size Verified' bit to one in the entry for that FDF1 in the internal FCF list of the cFCF 204. At step 312, the cFCF 204 requests establishment of a port-to-port link between the cFCF 204 and the FDF 202. In some embodiments, the cFCF 204 transmits a FIP Exchange Link Parameters (ELP) request to the FDF 202. At step 314, the FDF 202 accepts the ELP request, instantiating a virtual link between at least one port associated with the FDF 202 and at least one port associated with the cFCF 204, and transmits a FIP ELP reply back to the cFCF 204. At this point, the instantiated link becomes part of the distributed switch internal topology (i.e., the set of links internal to the distributed switch).

Upon instantiating a link with the FDF 202, the cFCF 204 initiates a FDF reachability notification (FDRN) with the backup (i.e., secondary) cFCF 206, if available, to keep the state synchronized and communicate to the secondary cFCF 206 that cFCF 204 has instantiated a link with another FDF.

FIG. 3B illustrates operations of the FDF 202 (e.g., FDF1) becoming functional within the fabric of the distributed network switch 180. Upon completion of the FDRN exchange, the cFCF 204 may provide to the now-joined FDF1 membership information associated with the distributed switch. At step 316, responsive to instantiating a link with the FDF1, the cFCF 204 transmits a distributed switch membership distribution (DFMD) message to communicate to an FDF 202 (i.e. FDF1) the identities of the primary cFCF 204 and secondary cFCF 206, if any, and of all the FDFs 202 that compose the distributed switch. In one implementation, the DFMD message contains WWNs of all fabric members and the fabric name for the distributed FCF. In some embodiments, the DFMD payload may be integrity protected by a cryptographic hash; in such an embodiment, the involved entities are provided with a shared key. If the primary cFCF 204 does not have a link with the destination FDF, the DFMD message may be relayed to the destination FDF by the intermediate FDFs. An example of DFMD message payload is shown in Table 2 below.

TABLE 2

Example Distributed Switch Membership Distribution (DFMD)

| Item | Size (Bytes) |
|---|---|
| Switch Fabric Internal Link Services (SW_ILS) Code = XX00 0008h | 4 |
| Destination FDF Switch_Name | 8 |
| Originating Controlling Switch Switch_Name | 8 |
| Descriptor List Length | 4 |

TABLE 2-continued

Example Distributed Switch Membership Distribution (DFMD)

| Item | Size (Bytes) |
|---|---|
| Fabric_Name | 8 |
| Membership Set Descriptor | Variable |
| Integrity Descriptor | Variable |

As shown in Table 2, the DFMD message may include a Destination FCDF Switch_Name which contains the Switch_Name of the destination FDF, an Originating Controlling Switch Switch_Name which contains the Switch_Name of the originating cFCF, a Descriptor List Length which contains the length in bytes of the subsequent list of descriptors, a Membership set descriptor which contains list of switch names for the Primary cFCF, the secondary cFCF, and the set of FDFs in the switch, and integrity descriptors which contains cryptographic information that protects the integrity of the DFMD payload. According to one embodiment, the DFMD message further includes a Fabric_Name which contains the Fabric Name of the distributed FCF. In one implementation, the Fabric_Name may be an 8-byte 16-digit hexadecimal value that is the WWN associated with the distributed FC switch fabric.

At step 318, the FDF1 receives, processes the DMFD message to extract the fabric name and other parameters contained within the DMFD message, and transmits a message (i.e., ACC DFMD) indicating acceptance of the DMFD message. In one embodiment, the FDF 202 learns the fabric WWN and modifies operation to join the fabric based on the fabric name contained in the DFMD message. In some embodiments, FDF 202 modifies to the internal state of the FDF to indicate the FDF has successfully joined a fabric associated with the fabric name. Responsive to joining the fabric, the FDF 202 may transmit discovery advertisement messages based on the modified internal state as described below.

In one embodiment, the cFCF 204 may re-compute the N_Port_ID routes and distributed the recomputed routes to each FDF belonging to the distributed switch through N_Port_ID Route Distribution (NPRD) exchanges. At step 320, the cFCF transmits a NPRD message to FDF1 that lists endpoints (e.g., server 105) logged in to other FDFs 202. In one embodiment, the FDF1 learns how to route frames to the cFCF based on information contained with the NPRD message. At step 322, the FDF1 transmits acceptance of the NPRD message (i.e., ACC NPRD).

At this point, the FDF1 considers itself part of the fabric and includes the fabric WWN in discovery advertisements. At step 324, the FDF1 broadcasts a FIP multicast Discovery Advertisement message which contains the WWN of the fabric to the "All-FCF-MACs" group address listened to by switching elements within the distributed network switch, for example, another FDF (e.g., FDF2) and cFCF 204. It should be recognized that even though the FDF1 may know that FDF2 is a fabric member, the FDF1 may be unable to send the FDRN required after virtual link instantiation until this point. At step 326, the FDF1 broadcasts a FIP multicast Discovery Advertisement message which contains the WWN of the fabric to an "All-ENode-MACs" group address listened to by endpoints logged into the distributed network switch, including the CNA 115 of the server 105. It should be appreciated that communication between the FDF1 and endpoints (e.g., CNA 115) may include a fabric login (FLOGI) from the endpoint device. Because the FDF1 may have been unable to perform FLOGI processing until this point, it should be further recognized that few benefits may be gained from the FDF1 advertising the fabric with the fabric name prior to this point.

While the foregoing is directed to embodiments of the present disclosure, other and further embodiments of the present disclosure may be devised without departing from the basic scope thereof, and the scope thereof is determined by the claims that follow.

What is claimed is:

1. A method for managing a distributed Fibre Channel over Ethernet (FCoE) fabric in which Fibre Channel frames are encapsulated in Ethernet frames, the method comprising:

transmitting from a first FCoE data-plane forwarder (FDF) to a controlling FCoE forwarder (cFCF) of the distributed Fibre Channel fabric a discovery advertisement message containing a fabric name field comprising a zero value;

receiving a unicast discovery solicitation message from the cFCF;

instantiating a switch link between the cFCF of the distributed Fibre Channel fabric and the first FDF responsive to accepting a request to establish the switch link comprising VA_port to VA_port link, wherein the distributed Fibre Channel fabric further comprises a set of FDFs, and wherein a VA_port is an instance of an FC-2V sublevel of the Fibre Channel;

receiving, from the cFCF, a distributed switch membership distribution (DFMD) message, wherein the DFMD message contains a fabric name identifying the distributed Fibre Channel fabric; and modifying the first FDF to join the distributed Fibre Channel fabric based on the fabric name contained in the DFMD message.

2. The method of claim 1, wherein the fabric name comprises a world-wide name (WWN) that uniquely identifies the distributed Fibre Channel fabric.

3. The method of claim 1, wherein the instantiating the switch link between the cFCF and the first FDF further comprises:

transmitting exchange link parameters (ELP) from the first FDF to the cFCF.

4. The method of claim 1, wherein the DFMD message further comprises a plurality of name identifiers identifying members of the distributed Fibre Channel fabric including the set of FDFs and the cFCF.

5. The method of claim 1, further comprising:

responsive to modifying the first FDF to join the distributed Fibre Channel fabric, transmitting to the set of FDFs discovery advertisements which contain the fabric name.

6. The method of claim 1, further comprising:

responsive to modifying the first FDF to join the distributed Fibre Channel fabric, transmitting to a plurality of end points coupled to the distributed Fibre Channel fabric discovery advertisements which contain the fabric name.

* * * * *